United States Patent [19]

Schmoock

[11] 4,204,240
[45] May 20, 1980

[54] HIGH-VOLTAGE IMPULSE DRIVER FOR ELECTROMAGNETIC FLOWMETER

[75] Inventor: Roy F. Schmoock, Richboro, Pa.

[73] Assignee: Fischer & Porter Co., Warminster, Pa.

[21] Appl. No.: 954,749

[22] Filed: Oct. 26, 1978

[51] Int. Cl.² ............................................. G01F 1/58
[52] U.S. Cl. ............................... 361/152; 73/194 CM
[58] Field of Search .............. 361/154, 152, 146, 140; 73/194 EM

[56] References Cited

U.S. PATENT DOCUMENTS

| | | | |
|---|---|---|---|
| 3,396,314 | 8/1968 | Corson et al. | 361/154 |
| 3,577,040 | 5/1971 | Campbell, Jr. | 361/154 |
| 3,706,011 | 12/1971 | Vincent | 361/154 |
| 3,783,687 | 1/1974 | Mannherz et al. | 73/194 EM |
| 3,790,862 | 2/1974 | Kampf et al. | 361/152 |
| 3,894,430 | 7/1975 | Rummel et al. | 73/194 EM |
| 3,955,413 | 5/1976 | Steele et al. | 73/194 EM |
| 3,996,797 | 12/1976 | Rorimaru et al. | 73/194 EM |
| 3,999,443 | 12/1976 | Appel et al. | 73/194 EM |
| 4,041,546 | 8/1977 | Steward | 361/152 |

Primary Examiner—Miller J. D.
Assistant Examiner—L. C. Schroeder
Attorney, Agent, or Firm—Michael Ebert

[57] ABSTRACT

A drive system for an electromagnetic flowmeter wherein the fluid to be metered is conducted through a flow tube to intersect a transverse magnetic field created by an electromagnet having an excitation coil. The resultant voltage induced in the fluid is transferred to a pair of electrodes mounted at diametrically-opposed points on the tube to yield a signal representing flow rate. The drive system, which is powered from an a-c line, includes a full-wave rectifier whose output voltage is applied periodically to the excitation coil at a rate which is low relative to the line frequency. In order to maintain the level of current through the coil at a substantially constant level during the excitation period without, however, consuming an undue amount of energy, the coil is shock-excited by a high voltage surge derived from the rectifier to generate a current flow therein having a substantially constant current level, thereby producing a steady-state flux field minimizing the presence of unwanted components in the output signal of the flowmeter.

8 Claims, 18 Drawing Figures

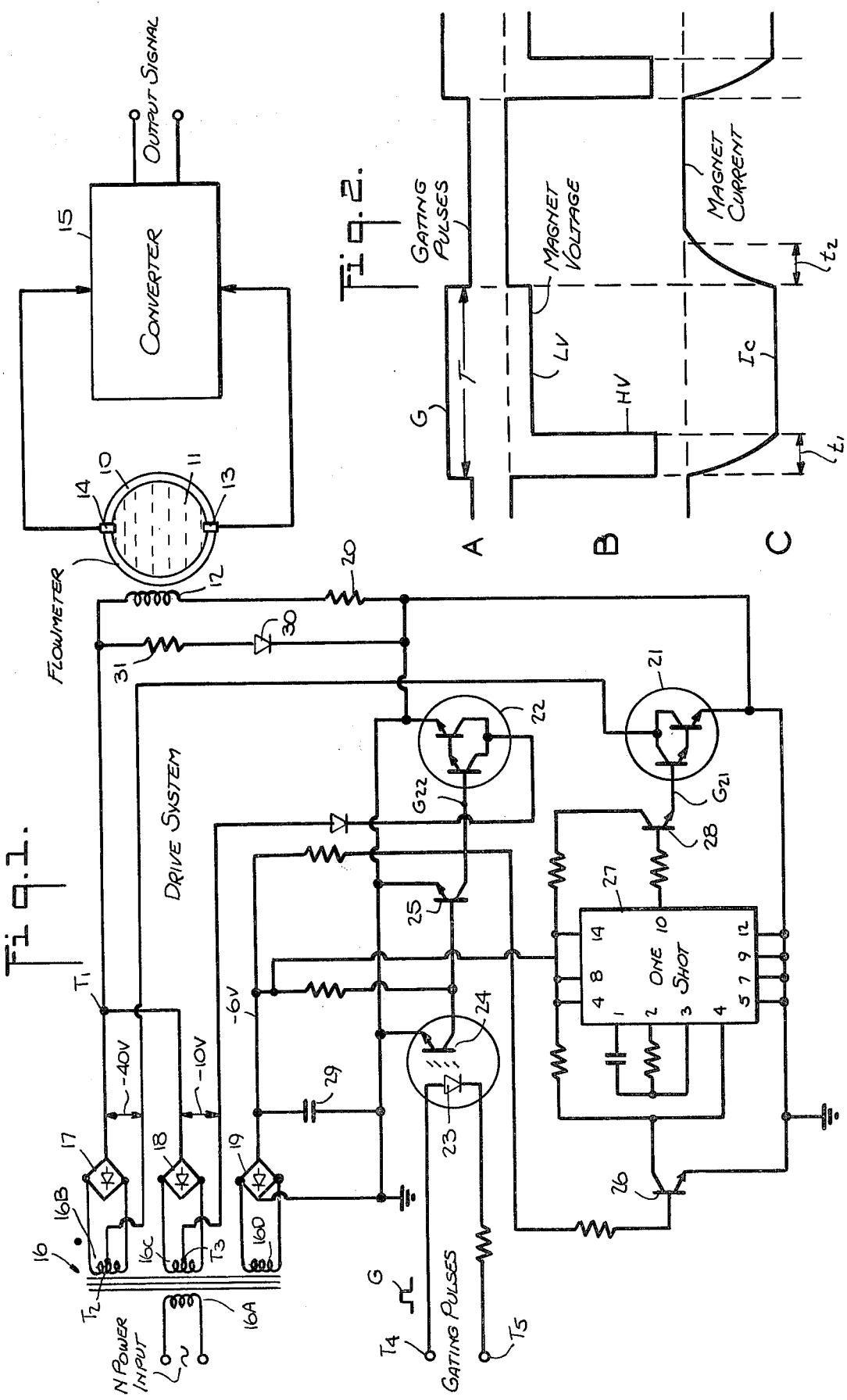

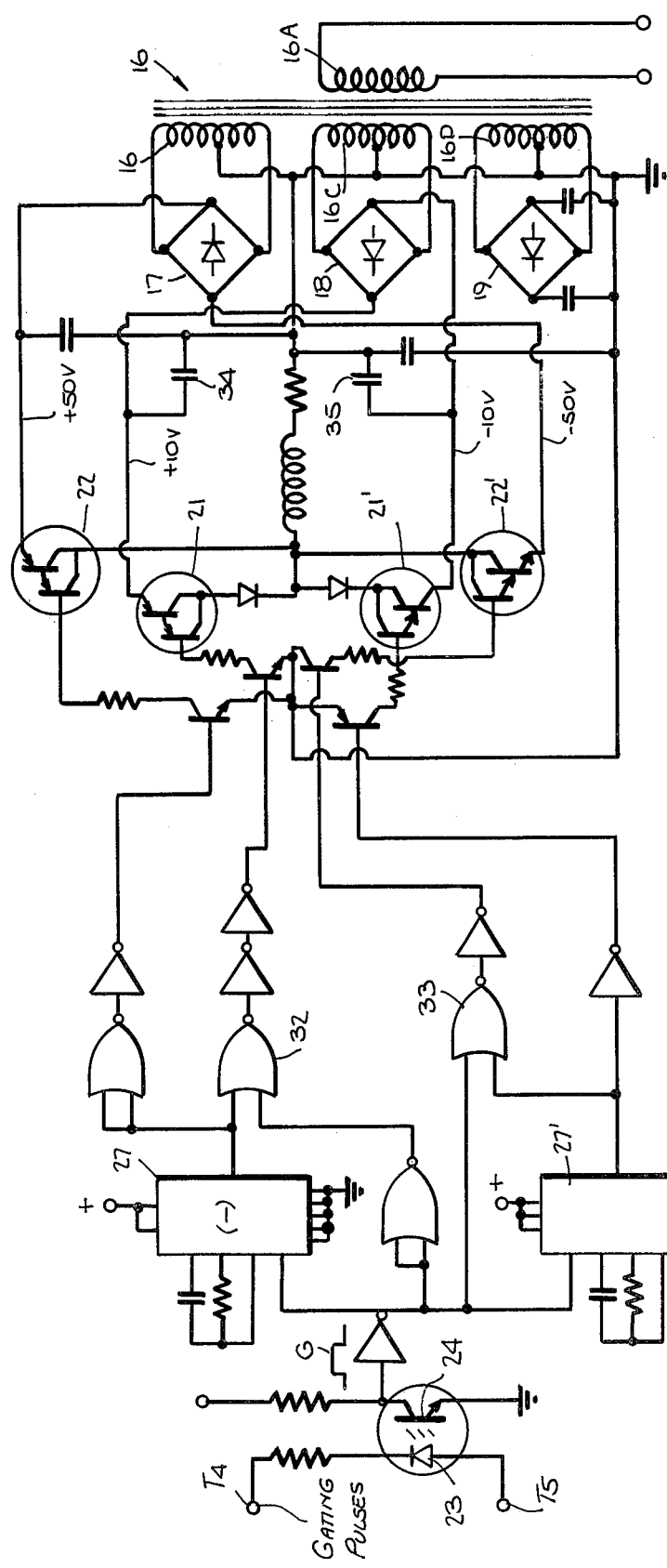
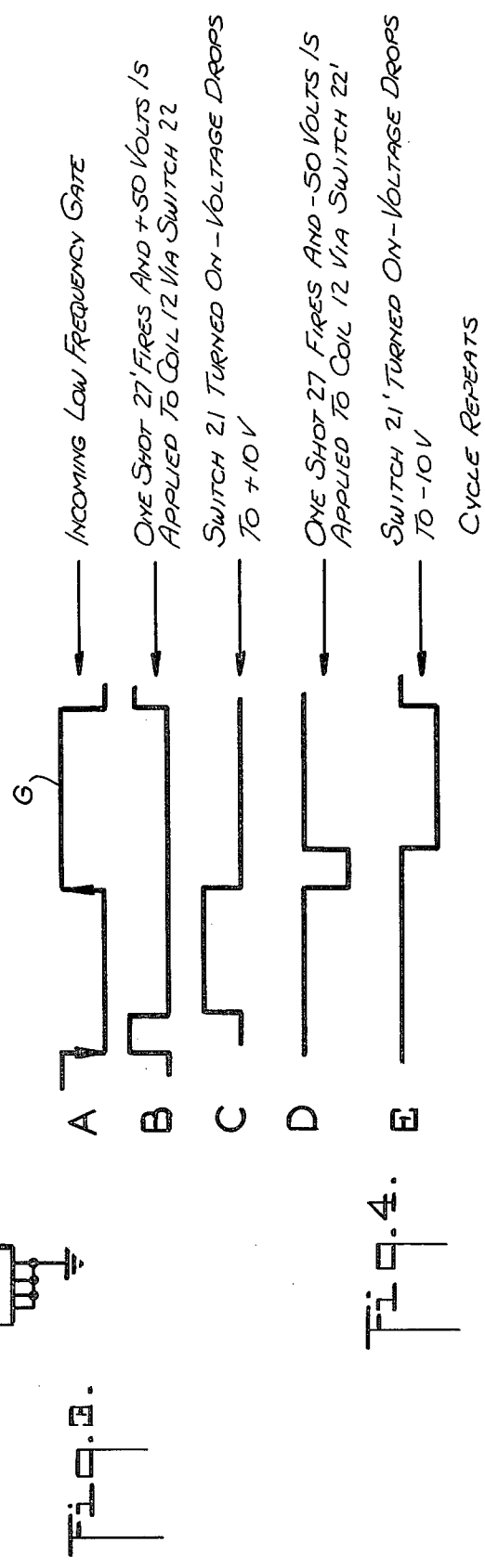
Fig. 3.
Fig. 4.

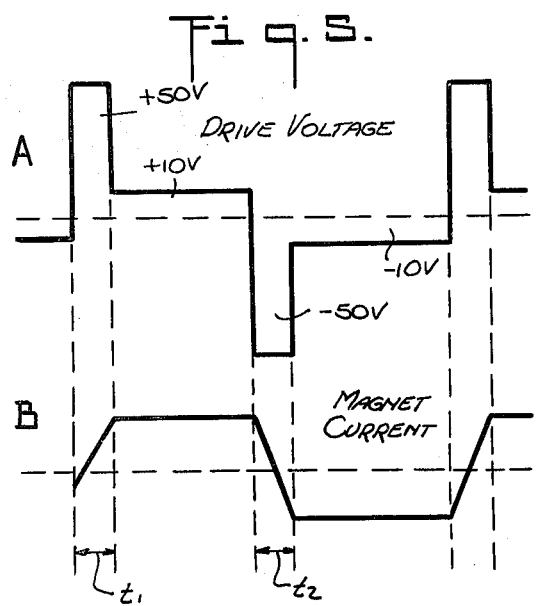
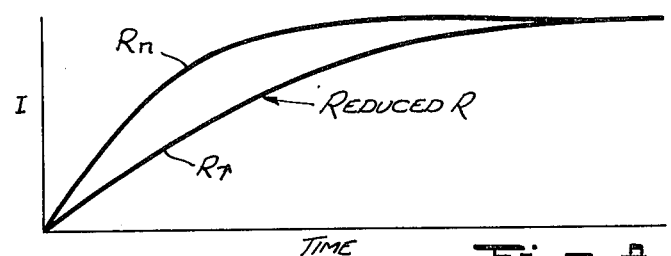
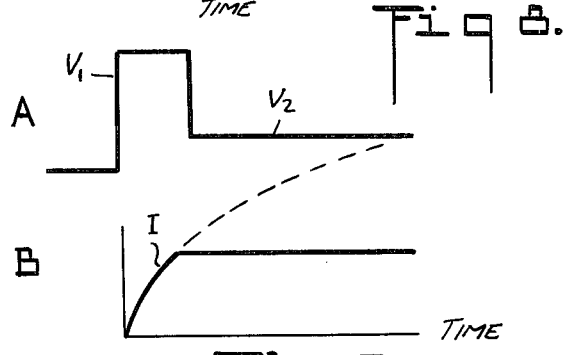
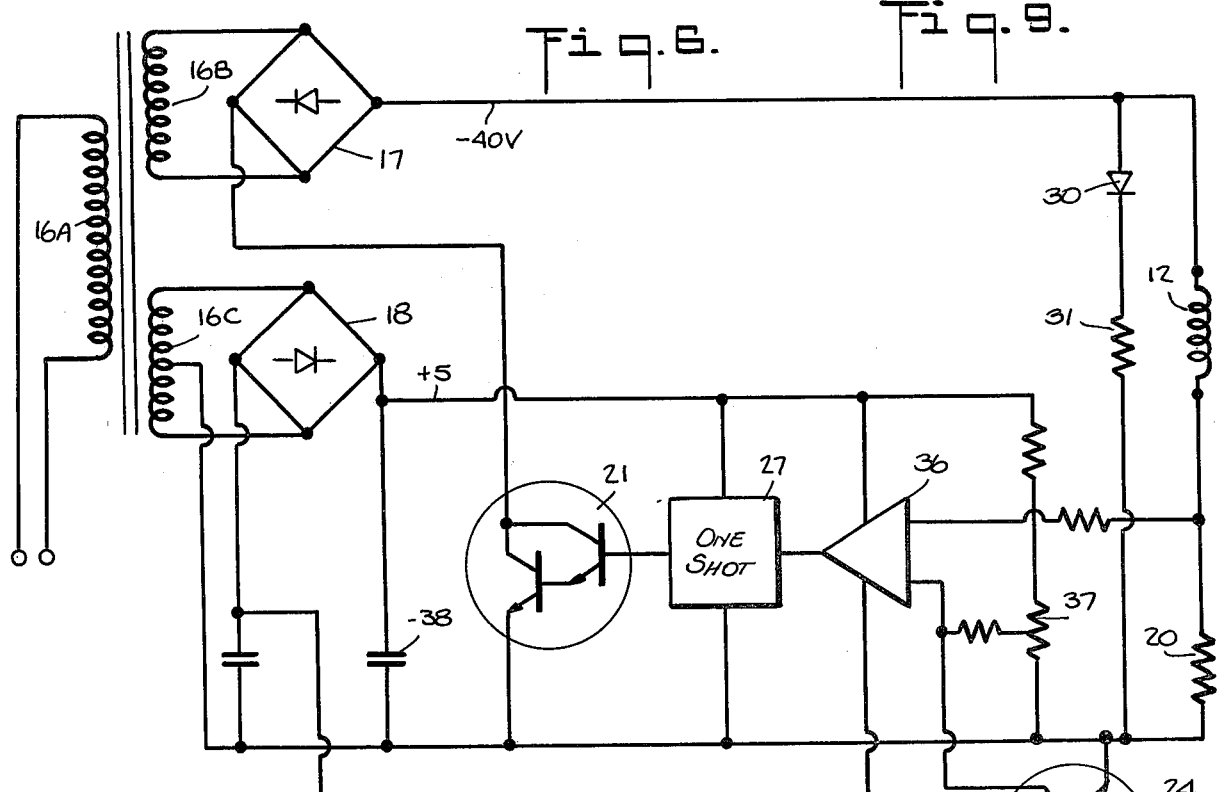
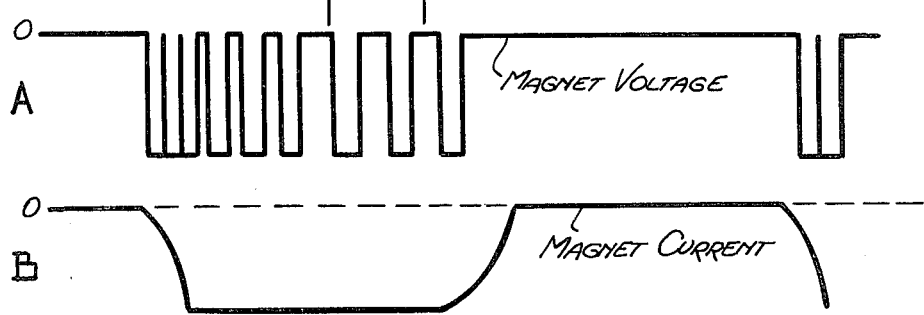
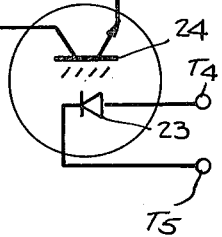

HIGH-VOLTAGE IMPULSE DRIVER FOR ELECTROMAGNETIC FLOWMETER

BACKGROUND OF THE INVENTION

This invention relates generally to electromagnetic flowmeters, and more particularly to a high-voltage impulse drive system for the excitation circuit of a meter of this type serving to effect a significant reduction in the power required to effect excitation.

In an electromagnetic flowmeter, the liquid whose flow rate is to be measured is conducted through a flow tube provided with a pair of diametrically-opposed electrodes, a magnetic field perpendicular to the longitudinal axis of the tube being established by an electromagnet. When the flowing liquid intersects this field, a voltage is induced therein which is transferred to the electrodes. This voltage, which is proportional to the average velocity of the liquid and hence to its average volumetric rate, is then amplified and processed to actuate a recorder or indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though A-C operation is clearly advantageous in that polarization is obviated and the A-C flow induced signal may be more easily amplified, it has distinct drawbacks. The use of an alternating flux introduces spurious voltages that are unrelated to flow rate and, if untreated, give rise to inaccurate indications. The two spurious voltages that are most troublesome are:

1. stray capacitance-coupled voltages from the coil of the electromagnet to the electrodes, and
2. induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow-induced voltage. Hence, that portion of the "quadrature voltage" that is in-phase with the flow-induced voltage signal constitutes an undesirable signal that cannot readily be distinguished from the flow induced signal, thereby producing a changing zero shift effect.

Pure "quadrature" voltage has heretofore been minimized by an electronic arrangement adapted to buck out this component, but elimination of its in-phase component has not been successful. Existing A-C operated electromagnet flowmeters are also known to vary their calibration as a function of temperature, fluid conductivity, pressure and other effects which can alter the spurious voltage both with respect to phase and magnitude.

Hence it becomes necessary periodically to manually re-zero the meter to correct for the effects on zero by the above-described phenomena.

All of the adverse effects encountered in A-C operation of electromagnetic flowmeters can be attributed to the rate of change of the flux field, $(d\phi)/dt$, serving to induce unwanted signals in the pick-up loop. If, therefore, the rate of change of the flux field could be reduced to zero value, then the magnitude of quadrature and of its in-phase component would become non-existent. Zero drift effects would disappear.

When the magnetic flux field is a steady state field, as, for example, with continuous d-c operation, the ideal condition $d\phi/dt=0$ is satisfied. But, as previously noted, d-c operation to create a steady state field is not acceptable, for galvanic potentials are produced and polarization is encountered.

In the patent to Mannherz et al., U.S. Pat. No. 3,783,687, whose entire disclosure is incorporated herein by reference, there is disclosed an electromagnetic flowmeter in which the excitation current for the electromagnetic coil is a low-frequency wave serving to produce a periodically-reversed steady state flux field, whereby unwanted in-phase and quadrature components are minimized without giving rise to polarization and galvanic effects.

In this prior patent, the driver system for exciting the coil includes switching means acting to periodically reverse the raw output of an unfiltered full-wave rectifier operated from an a-c power line. Because the electromagnet has a relatively high inductance, it functions as a filter choke which takes out a substantial percentage of the ripple component in the raw output of the rectifier, thereby obviating the need for filter capacitors. In This drive system, a logic circuit or divider is provided which is activated at the power line frequency (i.e., 50 or 60 Hz) to produce low frequency gating pulses for governing the electromagnetic reverse switching action.

Drive systems which are presently employed to provide excitation current for an electromagnetic flowmeter of the type disclosed in the Mannherz et al. patent utilize a constant-voltage drive. The long L/R time constant of the electromagnet produces a relatively slow magnet current rise time; hence a long excitation period is required to attain a constant flux level.

Because the total voltage and R are large, to reduce the magnet time constant to usable values, a substantial amount of power has to be dissipated by the drive system. As a consequence, a great amount of energy is lost in heat and the system is inefficient in power terms.

SUMMARY OF INVENTION

In view of the foregoing, the main object of this invention is to provide an energy-efficient drive system for the excitation coil of an electromagnetic flowmeter, which system is adapted periodically to generate a flow of current having a constant level through the coil.

More particularly, it is an object of this invention to provide a high-voltage impulse drive system of the above-type which shock-excites the electromagnet to produce an accelerated current flow therein for a predetermined period followed by a reduced voltage which then maintains the current at a constant level, which system, as compared to heretofore known constant-current drive systems, reduces the power requirements therefor by a factor of 2 to 4.

Also an object of the invention is to provide a drive system which makes use of an unfiltered a-c rectifier power supply and maintains a constant current through the magnet coil of the flowmeter regardless of line voltage variations.

Briefly stated, these objects are attained in an energy-efficient drive system for an electromagnetic flowmeter wherein the fluid to be measured is conducted through a flow tube to intersect a transverse magnet field created by an electromagnet having an excitation coil, the voltage induced in the fluid being transferred to a pair of diametrically-opposed electrodes in contact with the fluid.

To avoid spurious voltages arising from stray couplings between the electromagnet and the loop constituted by the electrodes and the fluid extending therebetween, without, however, causing polarization o the elecrodes, the drive system functions to energize the electromagnet to periodically generate an excitation current in the coil. This current is generated by applying the output voltage of an unfiltered full-wave rectifier to the coil in a manner shock-exciting the coil by a high voltage surge to produce a current flow therein having a substantially constant current level during the excitation period.

In one preferred embodiment of the invention, the drive system is actuated by periodic gating pulses, and the full-wave unfiltered rectifier has a high voltage section and a relatively low voltage section, a surge of voltage from the high-voltage section being applied to the excitation coil at a point coincident with the leading edge of the gating pulse to shock-excite the coil, the resultant current in the coil being maintained for the duration of the excitation period at a constant level by the low-voltage applied to the coil during this period. Because of the momentary use of a high-voltage, the energy requirement for the system is low compared to a drive system which makes use of a constant high-voltage.

OUTLINE OF DRAWINGS

For a better understanding of the invention as well as other objects and further features thereof, reference is made to the following detailed description to be read in conjunction with the accompanying drawings, wherein:

FIG. 1 is a schematic diagram of one preferred embodiment of a drive system in accordance with the invention;

FIGS. 2A, 2B and 2C are waveforms illustrative of the operation of the drive system;

FIG. 3 is a schematic diagram of a second preferred embodiment of a drive system in accordance with the invention;

FIGS. 4A, 4B, 4C, 4D and 4E are waveforms illustrative of the behavior of the drive system shown in FIG. 3;

FIGS. 5A and B are waveforms showing the relationship of the drive voltage to the magnet current in the system of FIG. 3;

FIG. 6 is a schematic diagram of a third embodiment of a drive system in accordance with the invention;

FIGS. 7A and 7B show waveforms illustrative of the FIG. 6 drive system;

FIG. 8 contains curves showing the relationship between current and time in the magnet coils; and FIGS. 9A and 9B show graphically how a drive voltage in accordance with the invention serves to reduce the time it takes to attain a steady state condition.

DESCRIPTION OF INVENTION

First Embodiment:

Referring now to FIG. 1, there is shown the drive system for an electromagnetic flowmeter whose primary includes a flow tube 10 through which a fluid 11 to be metered is conducted. An electromagnet having an excitation coil 12 serves to establish a magnetic field transverse to the direction of flow which is parallel to the longitudinal axis of the tube. Electrodes 13 and 14 in contact with the fluid are disposed at diametrically-opposed points on the flow tube on an axis perpendicular both to the longitudinal direction of flow and the transverse magnetic field.

As is well known, a voltage is induced in the fluid whose flow intersects the magnetic field to produce a low level a-c signal at the electrode terminals that reflect the flow rate. This flow-induced signal is applied to a secondary 15 which may be of the type disclosed in the Mannherz et al. patent to convert the low-level flow induced signal into a proportional d-c output signal in a range useful for process engineering, i.e., 4 to 20 mAdc.

The drive system for energizing excitation coil 12 includes a full-wave rectifier power supply constituted by a transformer 16 whose primary 16A is connected to an a-c power line, the line supplying the usual 50 or 60 Hz current. Transformer 16 is provided with three secondary sections 16B, 16C and 16D, secondaries 16B and 16C being center-tapped. Secondary 16B is connected to the input of a full-wave bridge rectifier 17, the step-down ratio between secondary 16B and primary 16A resulting in an unfiltered d-c output voltage of 40 volts between the output of the rectifier 17 at terminal $T_1$ and the midpoint terminal $T_2$ of secondary 16B. This, therefore, is the high-voltage section of the power supply.

Secondary 16C is connected to the input of a full-wave bridge rectifier 18 to produce between the midpoint terminal $T_3$ of this secondary and the output $T_1$ of rectifier 18 an unfiltered d-c output voltage of 10 volts. This, therefore, is the low-voltage section of the supply.

Secondary 16D is connected to the input of a full-wave bridge rectifier 19 whose output is applied to a filter capacitor 29 to yield a filtered d-c voltage of 6 volts for energizing the electronic components of the drive system, to be later described.

Terminal $T_1$, which is common to both the 40 volt and 10 volt unfiltered d-c sections, is connected to one end of excitation coil 12 whose other end is connected through a resistor 20 to the outputs of two Darlington-type power amplifiers 21 and 22, functioning as electronic power switches. The input of electronic switch 21 is connected to the midpoint terminal $T_2$ of the high-voltage section and the input of electronic switch 22 to the midpoint terminal $T_3$ of the low-voltage section. Hence when switch 21 is rendered operative, 40 volts is applied to excitation coil 12, and when switch 22 is rendered operative, the coil has 10 volts applied thereto.

Periodic gating pulses, which are preferably generated in the manner disclosed in the Mannherz et al. patent at a repetition rate which is low relative to the line frequency, are applied to input terminals $T_4$ and $T_5$, from which these pulses are fed to the light-emitting diode 23 of a photo-coupler, the light emitted thereby being picked up by a photo transistor 24 to produce output gating pulses which are applied through transistor amplifier 25 to the gate terminal G22 of electronic switch 22. The photo coupler acts to isolate the logic circuit producing the gating pulses from the drive system.

The gating pulses from the output of amplifier 25 are also fed through a second transistor amplifier 26 to the input of a one-shot 27 whose output is coupled through a transistor amplifier 28 to the gating electrode terminal $G_{21}$ of electronic switch 21.

When a gating pulse is applied to electronic switch 22 to render it conductive, switch 22 then acts to feed the low voltage (10 V) from the unfiltered rectifier supply to coil 12 for the full duration of the gating pulse. The leading edge of the same gating pulse serves to trigger one-shot 27 which then acts to render electronic switch 21 conductive to apply during the one-shot interval the high voltage (40 V) to excitation coil 12, the one-shot interval being very brief, as compared to the gating pulse period.

Electronic switch 21, during each excitation cycle, remains conductive for a relatively short time whose start is coincident with the leading edge of the gating pulse and whose conclusion depends on the time constant of one-shot 27. Thus applied to excitation coil 12 is a sudden drive surge of high voltage which functions to shock-excite the coil to produce a current flow therein which is maintained for the remainder of the gating pulse period at a substantially constant level by the low drive voltage. Thus the drive voltage wave has a stepped formation constituted by a high step followed by a low step.

Shunted across excitation coil 12 is a flyback catching network formed by a diode 30 in series with a resistor 31. Coil 12 is shock-excited by a surge of high voltage to initiate magnet current flow therethrough in one direction, which flow is maintained at a constant level for the remainder of the gating period by the low voltage applied to the coil. Upon the termination of the gating period, the magnetic field collapses to produce flyback flow in the reverse direction, diode 30 of the flyback catching network being then rendered conductive. The duration of the flyback interval is controlled by the value of resistor 31 in the network.

The waveform of the rectangular low-frequency gating pulses G is illustrated in FIG. 2A, each pulse having a duration T. The one-shot interval is represented by $t_1$, and it will be seen in FIG. 2B, which illustrates the waveform of the drive voltage for the electromagnet, that the high voltage surge HV occurs during interval $t_1$ which starts at zero voltage at the leading edge of the gating pulse and continues for a small portion of gating period T. In the remainder of this gating period, we have the low drive voltage LV which continues to a point in time determined by the trailing edge of the gating pulse G.

As shown in FIG. 2C, which illustrates the magnet current $I_c$ flowing through coil 12, during the high-voltage interval $t_1$, the current rises from zero to a high level, which level is maintained constant for the remainder of the gating period, the current then reversing direction during a flyback interval $t_2$, and falling back to zero, thereby completing the excitation cycle which is repeated when the next gating pulse appears.

Second Embodiment:

In the drive system shown in FIG. 1, a unidirectional drive voltage is produced; whereas in the system shown in FIG. 3, which functions in essentially the same way, the drive voltage yielded thereby to cause an excitation current to flow in the electromagnet coil 12 of the flowmeter is bi-directional in nature.

This is accomplished in a circuit arrangement which basically constitutes a doubling of that shown in FIG. 1. The drive system in FIG. 3 produces an alternating drive voltage, the positive half cycle of which has a stepped formation, with a high-voltage (+50 V) step followed by a low-voltage (+10 V) step, the negative half cycle having a like stepped formation, but with negative voltage values (see FIG. 5A).

As in the FIG. 1 arrangement, rectangular gating pulses at a low frequency rate derived from the converter of the flowmeter or from a suitable internal clock, are applied, as shown in FIG. 3, to terminals $T_4$ and $T_5$ which are connected to the light-emitting diode 23 of the photo-coupler having a photo-transistor 24. The output pulses from the photo-coupler are applied through a logic circuit to electronic switches of the Darlington-driver type, one set of switches 21 and 22 functioning to supply one polarity of the drive voltage, and the complementary set of switches 21' and 22' supplying the other polarity. The logic circuit, which includes NOR gates 32 and 33, acts to effect alternate operation of the two sets of electronic switches.

The plus and minus polarity high-voltage electronic switches 22 and 22' are controlled by one-shot 27 and the complementary one-shot 27'. One-shot 27 is triggered by the positive-going edge of the incoming gate, and one-shot 27' by the negative-going edge thereof. The high plus and minus voltages (50 V) are obtained from full-wave rectifier 17 coupled to center-tapped secondary 16B. A low plus and minus operating voltage for powering the drive circuit is obtained from full-wave rectifier 19 coupled to center-tapped secondary 16C. For low-frequency drive operation, all of the filter capacitors for the high and low voltage supplies, including capacitors 34 and 35, may be omitted; for the 120 cycle ripple component of the unfiltered full-wave rectified voltages is then effectively filtered out by the excitation coil functioning as a filter choke.

The timing sequence is shown graphically in FIG. 4. FIG. 4A illustrates the rectangular waveform of incoming gate pulses G of alternating polarity applied to terminals $T_4$ and $T_5$. The output of one-shot 27' is shown in FIG. 4B. This one-shot is fired at a point coincident in time with the leading edge of negative gate pulse G, causing a +50 volt drive to be applied to excitation coil 12 via electronic switch 22.

As shown in waveform 4C, electronic switch 21 is turned on at a point coinciding with the trailing edge of the timing interval of one-shot 27', causing a low voltage drive (+10 V) to be applied to coil 12. As shown in FIG. 4D, one-shot 27 is fired at a point coinciding with the trailing edge of the negative gating pulse G, causing a −50 volt drive to be applied to coil 12 via electronic switch 22'. Finally, as shown in FIG. 4E, switch 21' is turned on at a point coincident with the trailing edge of the timing interval of one-shot 27 to cause a low voltage drive (−10 V) to be applied to the coil.

Consequently, as shown in FIG. 5A, the positive half cycle of the drive voltage wave has a stepped formation to provide a +50 volt drive surge followed by a +10 volt current-maintenance drive, the negative half cycle having a like formation. The resultant magnet current is shown in FIG. 5B, where the time interval $t_1$, during which the drive voltage crosses the zero line, is determined by the duration of the +50 volt surge, and the time interval $t_2$, during which the drive voltage crosses the line in the reverse direction, is determined by the duration of the −50 volt surge.

Third Embodiment:

This embodiment provides a drive voltage for excitation coil 12 which, during the gating period, instead of being in the form of a high-voltage surge followed by a low level current-maintenance drive voltage for the remainder of the period, is composed of intermittent high-voltage surges whose respective durations are such as to maintain the magnet current at a constant level during the drive cycle. To this end, it is necessary to sense the current flowing through coil 12.

This is accomplished, as shown in FIG. 6, by a high-gain comparator 36 which monitors the voltage drop developed across resistor 20 connected in series with coil 12, this drop varying with magnet current flow. The variable input voltage to the comparator is compared with a set point voltage adjusted by a potentiometer 37 having a low d-c voltage (+5 V) applied thereto taken from a power supply constituted by secondary 16C of transformer 16, full-wave rectifier 18 and filter capacitor 38.

The output of comparator 36 is applied to one-shot 27, which, when fired, actuates electronic switch 21 to apply to coil 12 a high voltage (−40 V) obtained from secondary 16B and full-wave rectifier 17.

Comparator 36 functions to turn on one-shot 27 as frequently as is necessary to maintain a constant current flowing in the electromagnet coil, regardless of fluctuations in the line voltage. Thus the moment the magnet current falls below a predetermined constant current level, this fact is sensed by comparator 36 to fire one-shot 27 and turn on electronic switch 21 to again shock-excite the coil and bring the magnet current up to its desired level.

As shown in FIG. 7A, during each gating period, voltage surges are produced intermittently to provide energy sufficient to maintain the magnet current at a constant level. As shown in FIG. 7B, the collapse of the magnet current at the conclusion of the gating period is again controlled by the flyback catching network formed by diode 30 in series with resistor 31.

The advantage of the third embodiment over those disclosed in the previous figures is that an automatic control loop is created which senses fluctuations in magnet current and corrects therefor, thereby taking into account line voltage variations and other variables; whereas in the other embodiments, the drive voltages generated by the drive system are independent of the magnet current. Net power consumption is also reduced over that obtainable by the previous embodiments.

Power Savings:

We shall now explain how a drive system in accordance with the invention effects significant power savings.

The power consumed by the excitation coils of the electromagnetic flowmeter is determined by the $I^2R$ law. Consequently, a reduction in the ohmic value of resistance R will cut down power consumption in direct relation to the degree of R reduction. This is best effected by using a larger diameter wire for the excitation coils, but with the same number of turns, so that the inductance L of the coils remains the same, whereas the resistance R thereof is reduced.

This reduction of coil resistance R without a change in coil inductance L results in an increase in the L/R time, thereby extending the time required to attain a steady state condition. This is illustrated in FIG. 8, where the rise in current I in the excitation coils is plotted against time in curve $R_n$ which shows the normal rise rate of current until a steady state condition is attained. It will be evident by comparison with curve $R_r$ showing the rate of rise in current resulting from a reduction in the value of resistance R, that it takes much longer for the current to attain a steady state condition when operating with a reduced value of R.

In order to retain the power savings gained by reducing coil resistance without unduly extending the time it takes to attain a steady state current condition, a drive system in accordance with the present invention acts initially to apply a drive voltage to the excitation coils whose magnitude is far above the normal level, the drive voltage being abruptly reduced once the steady state condition is achieved.

This relationship between drive voltage and excitation current is illustrated in FIGS. 9A and B, where FIG. 9A shows the waveform of the applied voltage, and FIG. 9B the resultant current in the excitation coils. It will be seen from these figures that during the high voltage surge $V_1$, that current I in the coil rises rapidly, and that when the current attains the desired steady state level, the voltage is sharply reduced to level $V_2$ to maintain the current at this level.

The only practical limitation to the present drive system in effecting a reduction in power consumption are those imposed by copper volume and copper cost. Once an acceptable $I^2R$ loss is established, any ratio of $I^2$ and R may be selected for a given number of turns. This ratio will determine the operating current and voltages.

The following are examples of this operating principle:

| $I^2R$ = Constant — L = $N^2$ — ½ diameter = 4 × R | | | | |
|---|---|---|---|---|
| 1000 turns | I = 2 amp | R = 10Ω | L = 1 henry | $I^2R$ = 40 watts L/R = 0.1 sec. |
| 2000 turns | I = 1 amp | R = 40Ω | L = 4 henry | $I^2R$ = 40 watts L/R = 0.1 sec |
| 4000 turns | I = 0.5 amp | R = 160Ω | L = 16 henry | $I^2R$ = 40 watts L/R = 0.1 sec |

While there have been shown and described preferred embodiments of a high-voltage impulse driver for electromagnetic flowmeter in accordance with the invention, it will be appreciated that many changes and modifications may be made therein without, however, departing from the essential spirit thereof.

I claim:

1. In an electromagnetic flowmeter provided with a flow tube having a pair of electrodes mounted at diametrically-opposed positions therein, and an electromagnet having an excitation coil to produce a transverse magnetic field within said tube, the voltage induced in the liquid passing through said tube and intersecting said field being transferred to said electrodes to provide a flow-induced signal, an energy-efficient drive system to excite said electromagnet, said system comprising:

A a full-wave rectifier means connectable to an a-c line supplying power having a predetermined frequency and producing a rectified voltage;

B switching means responsive to gating pulses to connect the output of said rectifier means to said coil;

C means to apply gating pulses having a predetermined period to said switching means at a rate which is low relative to said power frequency;

D means operable during each gating period when said rectifier means output is connected to said coil to apply to said coil at the outset of this period a surge of high voltage to shock-excite said coil to cause a magnet current flow therein which attains a predetermined level and to continue to apply voltage to said coil to maintain the magnet current flow in said coil substantially at said predetermined level for the remainder of the gating period, whereby a steady state field is periodically established in said flow tube, and unwanted in-phase and quadrature components are minimized without giving rise to polarization and galvanic effects; and E means to sense the level of magnet current flowing through said coil to produce a control signal, and means responsive to said control signal to intermittently apply surges of voltage to said coil to maintain said magnet current at said level.

2. A drive system as set forth in claim 1, wherein said full-wave rectifier means is constituted by a high voltage and a low-voltage section, and said means operable during said gating period acts to apply said high-voltage to said coil to create said surge and to apply said low-voltage to said coil to maintain the magnet current flow therein.

3. A drive system as set forth in claim 2, wherein said switching means is constituted by a first electronic switch which connects said high voltage section to said coil and a second electronic switch which connects said low voltage section of said coil.

4. A drive system as set forth in claim 3, further including a one-shot device responsive to said gating pulses and coupled to said first switch to render said first switch operative for a predetermined interval to create said surge.

5. A drive system as set forth in claim 1, further including a photo-coupler responsive to said gating pulses to apply said pulses to said switching means.

6. A drive system as set forth in claim 2, wherein said gating pulses are of alternating polarity, and said high voltage and low voltage sections each provide voltages of positive and negative polarity, high-and-low voltages of positive polarity being applied to said coil in the period of said gating pulses of one polarity, and high-and-low voltages of negative polarity being applied to said coil in the period of said gating pulses of the opposite polarity.

7. A drive system as set forth in claim 1, wherein said sensing means is constituted by a comparator which compares said magnet current with a set point to produce said control signal when the current falls below the predetermined level.

8. A drive system as set forth in claim 7, further including a one-shot device activated by said control signal, said one-shot activating said switching means to connect said rectifier means to said coil.

* * * * *